United States Patent
Lahetkangas et al.

(10) Patent No.: US 9,548,838 B2
(45) Date of Patent: Jan. 17, 2017

(54) HYBRID AUTOMATIC REPEAT REQUEST IN COMMUNICATIONS

(75) Inventors: Eeva Lahetkangas, Oulu (FI); Esa Tapani Tiirola, Kempele (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 98 days.

(21) Appl. No.: 14/390,192

(22) PCT Filed: Apr. 2, 2012

(86) PCT No.: PCT/EP2012/055929
§ 371 (c)(1),
(2), (4) Date: Oct. 2, 2014

(87) PCT Pub. No.: WO2013/149635
PCT Pub. Date: Oct. 10, 2013

(65) Prior Publication Data
US 2015/0063250 A1  Mar. 5, 2015

(51) Int. Cl.
*H04L 1/18* (2006.01)
*H04W 74/02* (2009.01)

(52) U.S. Cl.
CPC ........... *H04L 1/1854* (2013.01); *H04L 1/1812* (2013.01); *H04L 1/1887* (2013.01)

(58) Field of Classification Search
None
See application file for complete search history.

(56) References Cited

U.S. PATENT DOCUMENTS

| | | | |
|---|---|---|---|
| 2008/0095109 A1* | 4/2008 | Malladi | H04L 1/1858 370/330 |
| 2011/0165906 A1* | 7/2011 | Papasakellariou | H04L 1/1692 455/522 |

(Continued)

FOREIGN PATENT DOCUMENTS

| | | |
|---|---|---|
| EP | 2 222 011 A2 | 8/2010 |
| JP | 2010/268463 A | 11/2010 |
| KR | 2011 0007585 A | 1/2011 |
| WO | WO 2011/053053 A2 | 5/2011 |

OTHER PUBLICATIONS

3GPP TS 32.500 V11.1.0 (Dec. 2011); 3rd Generation Partnership Project; Technical Specification Group Services and System Aspects; Telecommunication Management; Self-Organizing Networks (SON); Concepts and requirements (Release 11).

(Continued)

*Primary Examiner* — Duc Duong
(74) *Attorney, Agent, or Firm* — Harrington & Smith

(57) ABSTRACT

A method for hybrid automatic repeat request HARQ signalling in a communications system is disclosed. The method includes defining, in a communications apparatus, a link-independent HARQ entity for one link direction, wherein the defined entity includes a resource allocation for one or more of forward link and reverse link data, the resource allocation including at least one HARQ process having a process identification, each HARQ process having a unique HARQ identification, a data allocation having a predetermined timing offset with respect to the resource allocation, and a HARQ acknowledgement allocation having a predetermined timing offset with respect to the data allocation, wherein the timing offset of the HARQ acknowledgement with respect to the data allocation is determined in terms of time division duplexing TDD frames and independently of a forward link-reverse link ratio.

21 Claims, 9 Drawing Sheets

(56) References Cited

U.S. PATENT DOCUMENTS

| | | | | |
|---|---|---|---|---|
| 2011/0310830 A1* | 12/2011 | Wu | H04W 72/1289 | 370/329 |
| 2012/0113946 A1 | 5/2012 | Seo et al. | | 370/329 |
| 2013/0250772 A1* | 9/2013 | Yin | H04L 5/16 | 370/241 |
| 2014/0022962 A1* | 1/2014 | Yang | H04L 5/0055 | 370/280 |
| 2014/0328312 A1* | 11/2014 | Seo | H04L 1/1861 | 370/329 |
| 2015/0036607 A1* | 2/2015 | Park | H04L 5/0023 | 370/329 |

OTHER PUBLICATIONS

IEEE C802.16m-09/1130r1; Samsung Electronics Co., Ltd.; "Proposed A-MAP Relevance and HARQ Timing for the IEEE 802.16m amendment (Proposed Text for AWD)"; IEEE 802.16 Broadband Wireless Access Working Group, May 3, 2009.

White paper; 2020: Beyond 4G Radio Evolution for the Gigabit Experience; Beyond 4G White Paper, NSN Research (editors: Harri Holma and Peter Merz), 2011, (16 pages).

3GPP TS 36.211 V10.4.0 (Dec. 2011); 3rd Generation Partnership Project; Technical Specification Group Radio Access Network; Evolved Universal Terrestrial Radio Access (E-UTRA); Physical Channels and Modulation (Release 10), (101 pages).

3GPP TS 36.213 V10.4.0 (Dec. 2011); 3rd Generation Partnership Project; Technical Specification Group Radio Access Network; Evolved Universal Terrestrial Radio Access (E-UTRA); Physical layer procedures (Release 10), (125 pages).

TSG-RAN WG1 #60bis, Beijing, China, Apr. 12-16, 2010, R1-101825, "Backhaul UL Subframe Allocation in TDD LTE-A Relay", ZTE, 6 pgs.

3GPP TSG RAN1 #62, Madrid, Spain, Aug. 23-27, 2010, R1-104691, "Views on Un HARQ Issued for TDD", Motorola, 5 pgs.

* cited by examiner

FIG 2

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

| UL/DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | – | – | 6 | – | 4 | – | – | 6 | – | 4 |
| 1 | – | – | 7, 6 | 4 | – | – | – | 7, 6 | 4 | – |
| 2 | – | – | 8, 7, 4, 6 | – | – | – | – | 8, 7, 4, 6 | – | – |
| 3 | – | – | 7, 6, 11 | 6, 5 | 5, 4 | – | – | – | – | – |
| 4 | – | – | 12, 8, 7, 11 | 6, 5, 4, 7 | – | – | – | – | – | – |
| 5 | – | – | 13, 12, 9, 8, 7, 5, 4, 11, 6 | – | – | – | – | – | – | – |
| 6 | – | – | 7 | 7 | 5 | – | – | 7 | 7 | – |

US 9,548,838 B2

HYBRID AUTOMATIC REPEAT REQUEST IN COMMUNICATIONS

FIELD OF THE INVENTION

The exemplary and non-limiting embodiments of this invention relate generally to wireless communications networks, and more particularly to hybrid automatic repeat request (HARQ) signalling.

BACKGROUND ART

The following description of background art may include in-sights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Hybrid automatic repeat request (hybrid ARQ or HARQ) is a combination of high-rate forward error-correcting coding and ARQ error-control for detectable but non-correctable errors. In hybrid ARQ, a code may be used in order to perform forward-error correction and error detection by correcting a subset of errors while relying on ARQ to correct errors that are non-correctable using only redundancy sent in an initial transmission. HARQ in LTE is based on using a stop-and-wait HARQ procedure. When a packet is transmitted from eNode-B, UE decodes it and provides feedback on PUCCH. A similar procedure takes place in uplink side where a packet is transmitted from UE, and eNode-B decodes it and provides feedback on PHICH (physical HARQ indicator channel).

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, and a computer program product as defined in the independent claims. Further embodiments of the invention are disclosed in the dependent claims.

An aspect of the invention relates to a method for hybrid automatic repeat request HARQ signalling in a communications system, the method comprising defining, in a communications apparatus, a link-independent hybrid automatic repeat request HARQ entity for one link direction, wherein the defined entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio.

A further aspect of the invention relates to an apparatus comprising at least one processor; and at least one memory including a computer program code, wherein the at least one memory and the computer program code are configured to, with the at least one processor, cause the apparatus to define, a link-independent hybrid automatic repeat request HARQ entity for one link direction, wherein the defined entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio.

A still further aspect of the invention relates to a user terminal comprising at least one processor; and at least one memory including a computer program code, wherein the at least one memory and the computer program code are configured to, with the at least one processor, cause the user terminal to receive and provide feedback related to a link-independent hybrid automatic repeat request HARQ entity defined for one link direction, wherein the entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio.

A still further aspect of the invention relates to a computer program product comprising program code means adapted to perform any one of the method steps when the program is run on a computer.

BRIEF DESCRIPTION OF THE DRAWINGS

In the following the invention will be described in greater detail by means of exemplary embodiments with reference to the attached drawings, in which

FIG. 2 illustrates UL/DL configurations and downlink association set index for TDD;

DETAILED DESCRIPTION OF SOME EMBODIMENTS

An exemplary embodiment relates to a beyond 4G (B4G) radio system. An exemplary embodiment may, however, also be introduced in an evolution of LTE within any new release. An exemplary embodiment relates to an arrangement minimizing the hybrid automatic repeat request (HARQ) feedback delay in a time division duplex (TDD) based local area radio system. A further exemplary embodiment relates to minimizing a baseband complexity by means of a reduced HARQ soft buffer size at a receiver end.

HARQ in LTE-advanced enables providing robustness against non-idealities, such as link adaptation error, and providing throughput gain by allowing an increase of a BLER operation point. However, in conventional TDD LTE-advanced (which may also be referred to as TD-LTE), HARQ introduces significant complexity. HARQ timing is a complicated subsystem and results in variable and worse latency performance compared to frequency division duplex (FDD) LTE. Improving latency is very relevant in the B4G radio system where a tight latency target of ~1 ms has been defined.

Unlike a wide area cellular system, a local area radio system may utilize a local-access-only frequency band including classical operator deployment and shared spectrum usage, a license-exempt spectrum or white spaces to take advantage of additional available bandwidth. In addition, the local area system may offer an efficient device-to-device operation mode to establish ad-hoc networks. A local area environment also enables a delay-optimized radio system design which in turn allows reduction of HARQ re-transmission delay from conventional LTE/LTE-advanced level (RTT is of the order of 10 ms in FDD mode). In order to achieve more efficient and cleaner HARQ on top of a flexible TDD configuration, modifications to a physical HARQ structure and the LTE-advanced TDD radio are needed.

A time division duplex (TDD) LTE frame is built on top of a LTE frame structure type 2. Since in most cases the FDD solution is just copied to a TDD size and TDD specific changes are minimized, there is not too much TDD optimization in conventional LTE-TDD. This also has an impact on the LTE TDD HARQ structure, the related latency and complexity.

Figure 1:
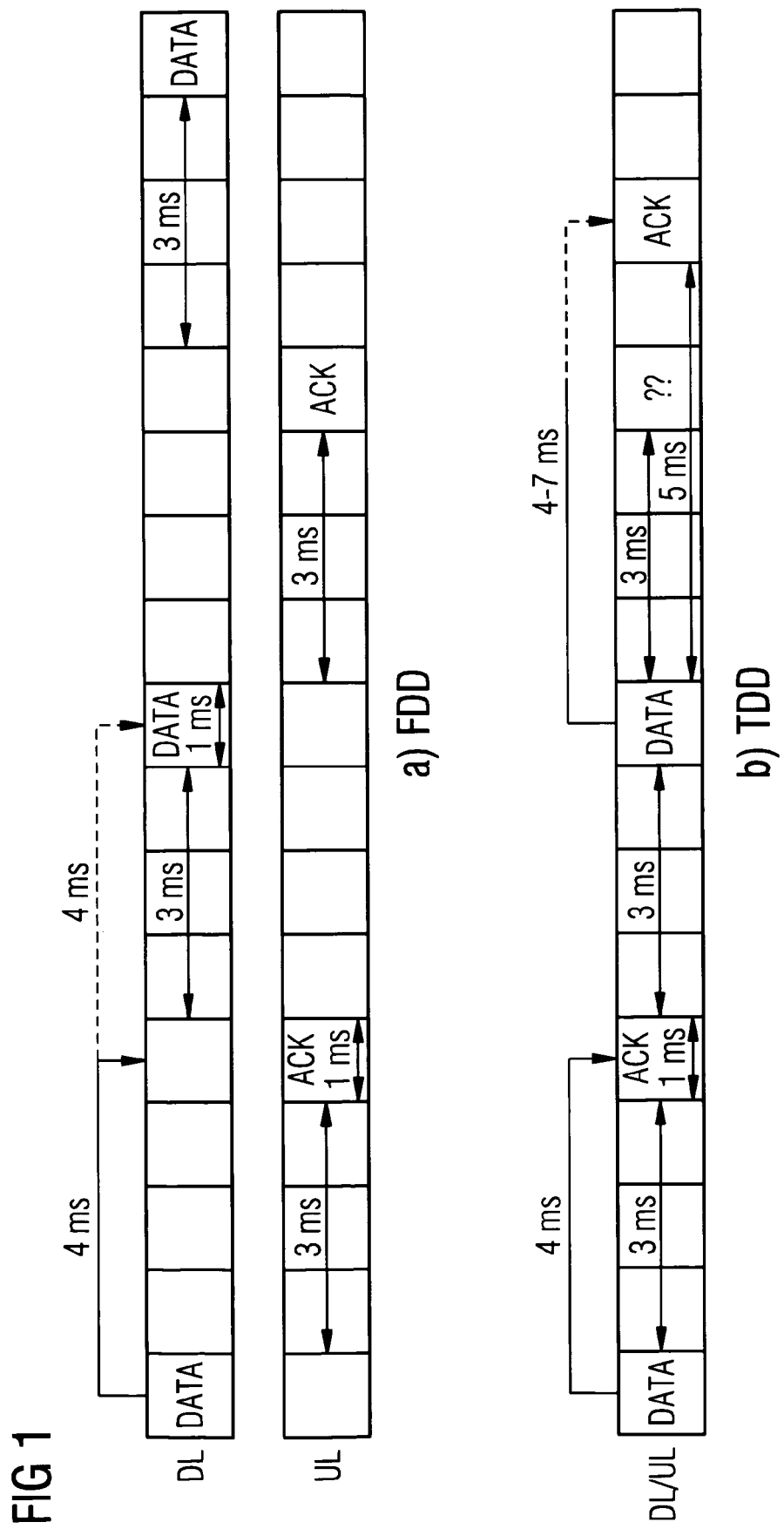
FIG. 1 illustrates HARQ timing diagrams for LTE-FDD and LTE-TDD.

FIG. 1 illustrates HARQ delay in LTE FDD (a) and TDD (b), wherein HARQ timing diagrams for LTE-FDD and LTE-TDD are presented. FIG. 2 illustrates UL/DL configurations and downlink association set index for TDD, wherein related uplink/downlink (UL/DL) configurations and HARQ downlink association set indexes for LTE-TDD are presented. It can be clearly seen that TDD is more challenging than FDD from a delay performance point of view.

In traditional AP/eNB←→UE communication, link directions UL and DL are well defined. However, it should be noted that the link directions may not be similarly defined in the case of D2D or AP2AP communications in which an exemplary embodiment is equally valid. For example, DL and UL may be illustrated by means of "transmit" and "receive" phases, where Tx and Rx phases are opposite for two network nodes (source and destination nodes) part of data transfer. Thus, instead of "uplink" and "downlink", more generic terms, such as "forward link" and "reverse link" may be used.

When the HARQ re-transmission delay in LTE-FDD is always 8 ms, LTE-TDD suffers from an additional delay component due to unavailable UL/DL. Hence, the HARQ re-transmission delay (≥8 ms) varies according to a link direction, subframe number and UL/DL configuration. HARQ timing is a complicated subsystem, and results in a variable and worse latency performance compared to FDD. This becomes much more complicated with future use cases, e.g. when considering HARQ on top of multi-hop communications.

In TDD LTE-advanced, the HARQ structure and timing is not constant like in FDD. The HARQ process and timing have been designed separately for different UL/DL configurations and subframe structures. The number of HARQ processes depends on the UL/DL configuration and up to 15 HARQ processes for DL and up to 8 processes for UL have been defined. There are different timing tables defined for PHICH (UL HARQ ACK/NACK), PUCCH and PUSCH (DL HARQ ACK/NACK). The exact HARQ timing relations for each TDD configuration have been defined.

A frame structure enabling fast TDD access and fully flexible UL/DL switching, a TDD frame structure with support of fast UL/DL switching and fully flexible UL/DL ratio has been proposed. That flexible TDD frame structure proposed may be used as a basis in a HARQ scheme according to an exemplary embodiment.

An exemplary embodiment enables having a clean (i.e. "FDD-like") HARQ with support of low latency on top of a flexible TDD configuration. An exemplary embodiment comprises link-independent HARQ signalling with a frame-based HARQ timing and a HARQ process with possibility to have both an UL and DL HARQ process asynchronously in each frame.

According to an exemplary embodiment, the link-independent HARQ entity for one hop and one link direction comprises following elements:

Resource allocation for UL or DL data (in an exemplary embodiment, resource allocation signalling may convey both UL and DL resource allocation in a single resource allocation grant message). The allocated resource (UL or DL) consists of at least one HARQ process with a process ID, each HARQ process having its own HARQ ID. The maximum number of HARQ processes available may be upper-bound by the signalling and implementation constraints.

Data allocation with a predefined timing offset with regard to resource allocation. The offset may be set in a different manner for UL and DL.

HARQ-ACK resource allocation with a predetermined timing offset with regard to data allocation.

The timing offset for data allocation and HARQ-ACK is defined in terms of frames and independently of the UL/DL ratio.

In an exemplary embodiment, there is possibility to allocate one or more (UL or DL) HARQ processes in a single frame. This improves the flexibility of dynamic UL/DL allocation.

In an exemplary embodiment, there is a possibility to have two HARQ processes in a frame. These processes may be allocated in different ways: one to UL and the other to DL, both to DL, or both to UL.

The HARQ entity according to an exemplary embodiment is built on top of the flexible TDD frame structure with a possibility to have both UL and DL control signals (resource allocation and HARQ-ACK) as well as UL and DL data signals in a single TDD frame.

Figure 3:
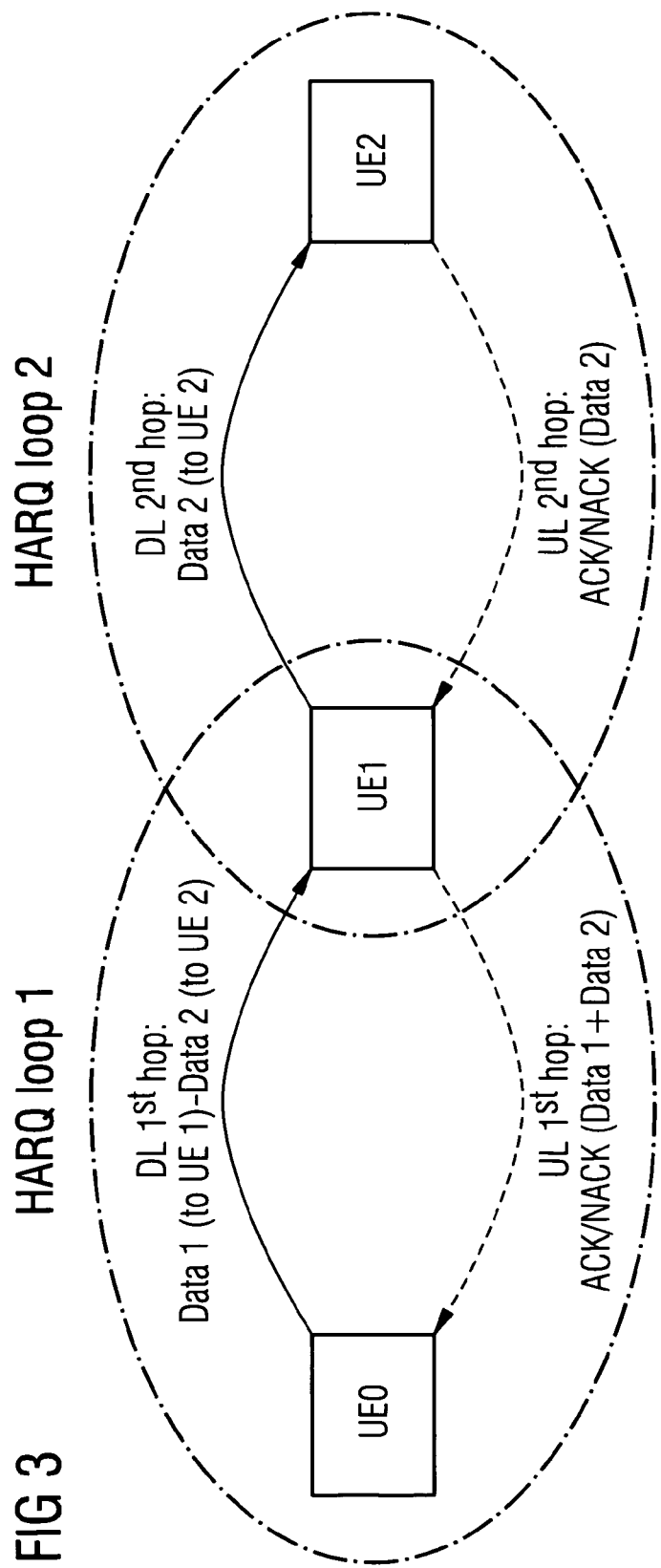
FIG. 3 illustrates a multi-hop scenario comprising separate hop specific HARQ entities.

The entire HARQ system for a single hop may be achieved by combining two HARQ entities representing UL and DL HARQ. The exemplary arrangement also allows chaining of the HARQ entities in order to facilitate efficient HARQ for multi-hop communications (e.g. mesh networks, relaying via UE, multi-hop relays). In an exemplary embodiment, each hop has its own HARQ loop running and the exemplary signalling arrangement takes care that each node has a capability to transmit the control signalling needed to support full-blown HARQ via the involved links. A multi-hop scenario comprising separate hop specific HARQ entities is illustrated in FIG. 3. FIG. 3 illustrates a multi-hop scenario comprising of separate HARQ loops for each hop. Data transmission corresponding to a single link direction only is shown in FIG. 3. Similar loops are needed in case UE2 transmits data via UE1.

An exemplary embodiment enables a clean (FDD-like) and link independent HARQ on top of a flexible TDD configuration. An exemplary HARQ entity may be built on top of a flexible TDD frame structure enabling fast TDD access and fully flexible UL/DL switching. With the flexible TDD frame structure it is possible to have both UL and DL control signals (resource allocation and HARQ-ACK) as well as UL and DL data signals in a single TDD frame. By using an exemplary frame structure, the UL/DL ratio may be adjusted within the frame and the most critical UL/DL signalling may be kept free from cross-link interference.

Figure 4:
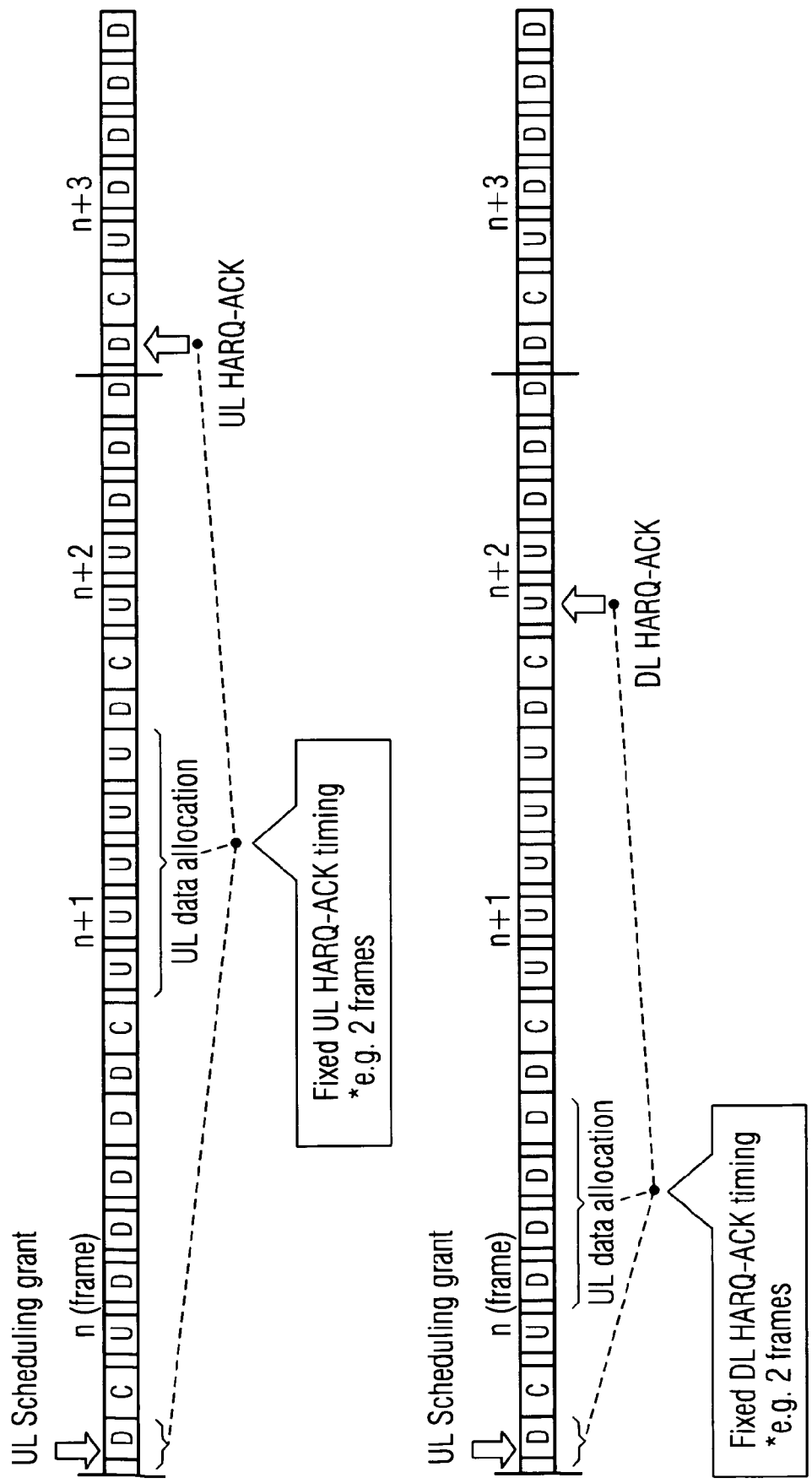
FIG. 4 illustrates exemplary UL & DL HARQ signalling.

In an exemplary embodiment, features of the flexible TDD frame structure may be used for designing the exemplary link-independent HARQ entity (see FIG. 4 illustrating exemplary UL & DL HARQ signalling) which comprises following elements (for one hop and one link direction):

Resource allocation for UL or DL data (scheduling grant). The allocated resource (UL or DL) comprises at least one HARQ process with a process ID, each HARQ process having a unique HARQ identification. Multi-TTI scheduling comprising multiple HARQ processes may be supported as well.

UL or DL data allocation with a predefined timing offset with respect to the resource allocation. The offset may be set in a different manner for UL and DL (offset is zero with DL grant and one frame with UL grant in the example situation of FIG. 4).

HARQ-ACK resource allocation with a predetermined timing offset with respect to the data allocation (offset is two frames in the example of FIG. 4). HARQ-ACK resource may be signalled as a part of UL/DL resource allocation (explicitly or implicitly).

Timing offsets for data allocation and HARQ-ACK are defined independently of the UL/DL ratio. Because the flexible TDD frame structure may have both UL and DL control signals in a single frame, HARQ timing may be fixed and counted in frames, as presented in FIG. 4. In other words, timing follows a FDD principle.

Because the flexible TDD frame structure may have both UL and DL control signals, as well as UL and DL data signals in a single TDD frame, the HARQ signalling according to an exemplary embodiment is independent of the data link direction. This is a remarkable enhancement compared to conventional link dependent HARQ of LTE-advanced (TD-LTE).

Figure 5:
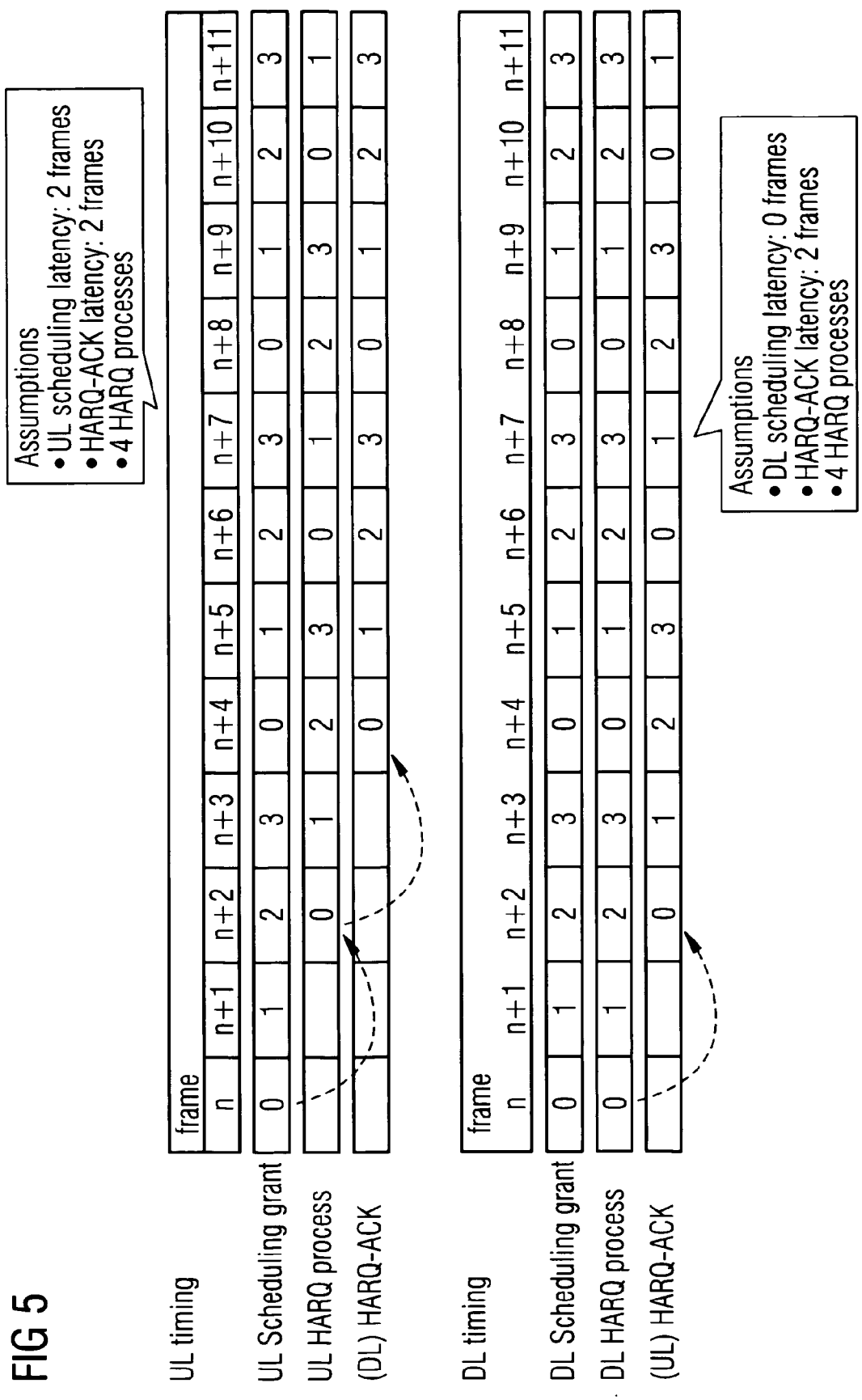
FIG. 5 illustrates exemplary HARQ timing.

The HARQ scheme according to an exemplary embodiment is designed in such a way that each frame may contain both the UL process and the DL process. FIG. 5 illustrates exemplary HARQ timing, where exemplary HARQ timings for both UL and DL are given. Both UL and DL HARQ may be designed to be asynchronous. Existence of UL and DL HARQ process in a frame may be determined on-need basis depending on the used UL/DL ratio. eNB may have a possibility to allocate one or more (UL or DL) HARQ processes in a single frame (not shown in FIG. 5).

Figure 6:
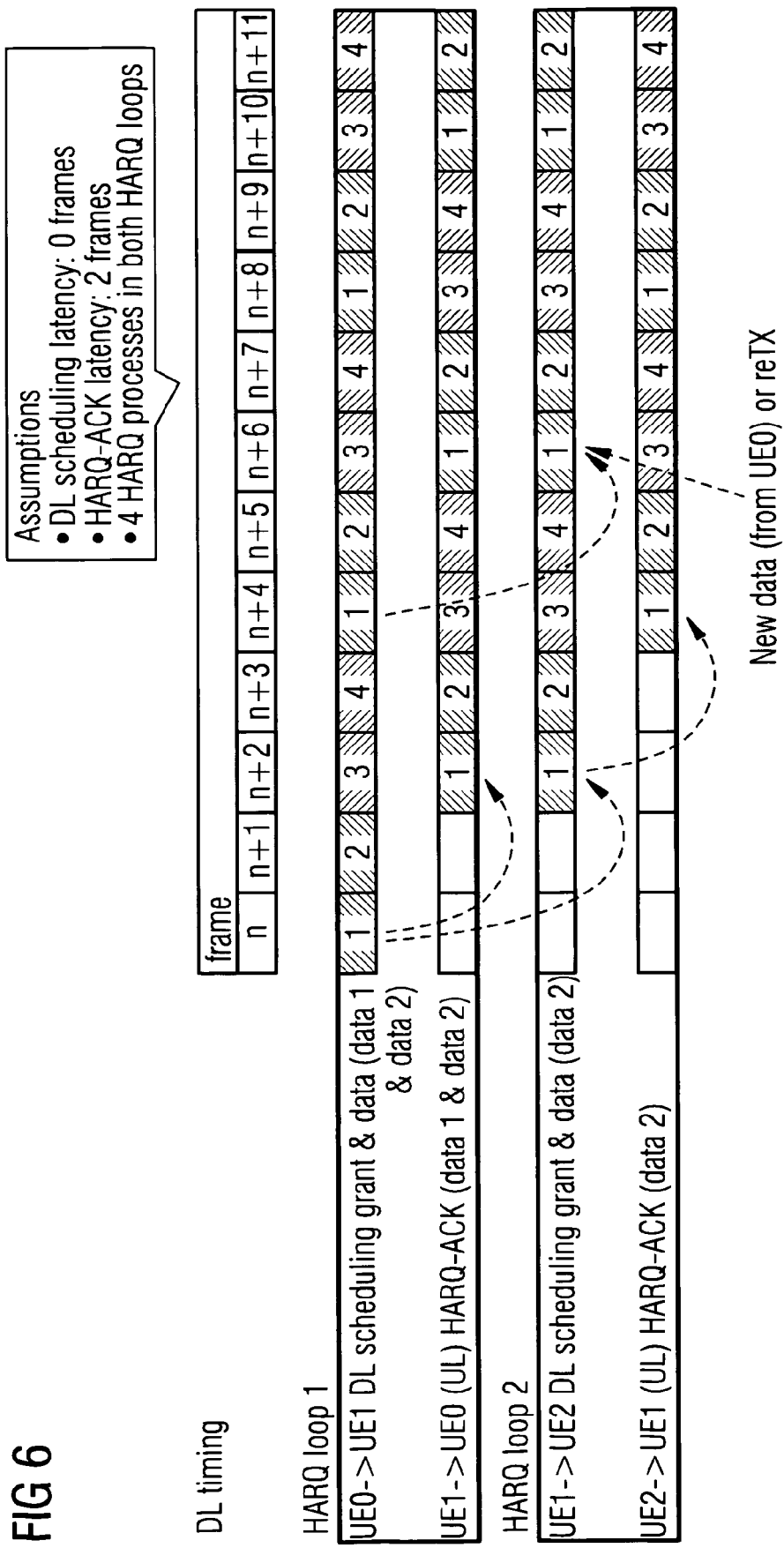
FIG. 6 illustrates an exemplary timing diagram for a DL multi-hop scenario.

Due to its link independent nature, the HARQ arrangement according to an exemplary embodiment is also well-suited for multi-hop scenarios such as mesh networks, relaying via UE, multi-hop relays, etc. The HARQ scheme according to an exemplary embodiment allows chaining of the HARQ entities in such a way that each hop (DL & UL included) has its own HARQ loop. FIG. 6 illustrates DL HARQ timing example of a multi-hop scenario, where an exemplary timing diagram for DL multi-hop scenario comprising two hops (see FIG. 3) is shown. In this scenario, UE0 is sending data to UE2 via UE1 (in addition to the single-hop data transmission between pairs UE0↔UE1 and UE1↔UE2). Thus, UE0 and UE1 use a 1st hop specific HARQ loop, and a 2nd hop specific HARQ loop is in use between UE1 and UE2. Data sent in 1st hop HARQ process actually targeted for UE2 may be forwarded by UE1 to 2nd hop HARQ loop, as soon as the data has been received correctly and acknowledged in the 1st hop HARQ loop. The HARQ entities for different hops may have different configurations, such as number of HARQ processes in the loop, timing offsets for data allocation and HARQ-ACK, etc.

The HARQ scheme according to an exemplary embodiment supports a clean (FDD-like) and simple link independent HARQ functionality on top of flexible TDD configuration. The exemplary arrangement allows to maximize similarity of FDD and TDD modes.

The TDD HARQ signalling timing is not dependent on the UL/DL ratio. The HARQ timing may be fixed and counted in frames. The size of a HARQ-ACK resource may be made fixed (i.e. independent on the UL/DL ratio). This is clear improvement compared to TD-LTE. It is possible for each frame to contain UL and DL HARQ processes in an asynchronous manner. The exemplary arrangement allows to take full benefit of flexible UL/DL allocation by allowing more than one (UL, DL or both) HARQ process in a single frame. An exemplary embodiment enables FDD-alike HARQ for half-duplex devices in case of multi-hop communication. An exemplary embodiment enables usage of fewer HARQ processes (compared to LTE-advanced). This reduces not only the latency but also memory consumption since less receiver HARQ buffers are needed. This may be considered as a major improvement in B4G systems where a 10 Gbit/s peak data rate may otherwise cause remarkable device memory requirements.

Exemplary embodiments will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, network node, server, corresponding component, and/or to any communication system or any combination of different communication systems that support HARQ signalling. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be ap-plied, an architecture based on LTE (long term evolution) network elements, without restricting the embodiment to such an architecture, however. The em-bodiments described in these examples are not limited to the LTE radio sys-tems but can also be implemented in other radio systems, such as UMTS (universal mobile telecommunications system), GSM, EDGE, WCDMA, bluetooth network, WLAN or other fixed, mobile or wireless network. In an embodiment, the presented solution may be applied between elements belonging to different but compatible systems such as LTE and UMTS.

Figure 7:
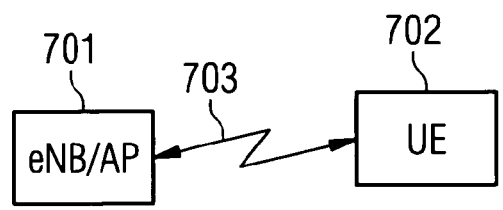
FIG. 7 shows a simplified block diagram illustrating exemplary system architecture.

A general architecture of a communication system is illustrated in FIG. 7. FIG. 7 is a simplified system architecture only showing some ele-ments and functional entities, all being logical units whose implementation may differ from what is shown. The connections shown in FIG. 7 are logical connections; the actual physical connections may be different. It is apparent to a person skilled in the art that the systems also comprise other functions and structures. It should be appreciated that the functions, structures, elements and the protocols used in or for group communication, are irrelevant to the actual invention. Therefore, they need not to be discussed in more detail here.

The exemplary radio system of FIG. 7 comprises a network node 701 of a network operator. The network node 701 may include e.g. an LTE (and/or LTE-A) base station (eNB), base transceiver station (BS, BTS), access point (AP), radio network controller (RNC), mobile switching centre (MSC), MSC server (MSS), mobility management entity (MME), gateway GPRS support node (GGSN), serving GPRS support node (SGSN), home location register (HLR), home subscriber server (HSS), visitor location register (VLR), or any other network element, or a combination of network elements. The network node 601 may be connected to one or more further network elements via an interface (not shown in FIG. 7). In FIG. 7, the radio network node 701 that may also be called eNB (enhanced node-B, evolved node-B) of the radio sys-tem hosts the functions for radio resource management in a public land mobile network. FIG. 7 shows one or more user equipment 702 located in the service area of the radio network node 701. The user equipment refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 7, the user equipment 702 is capable of connecting to the radio network node 701 via a connection 703.

Figure 8:
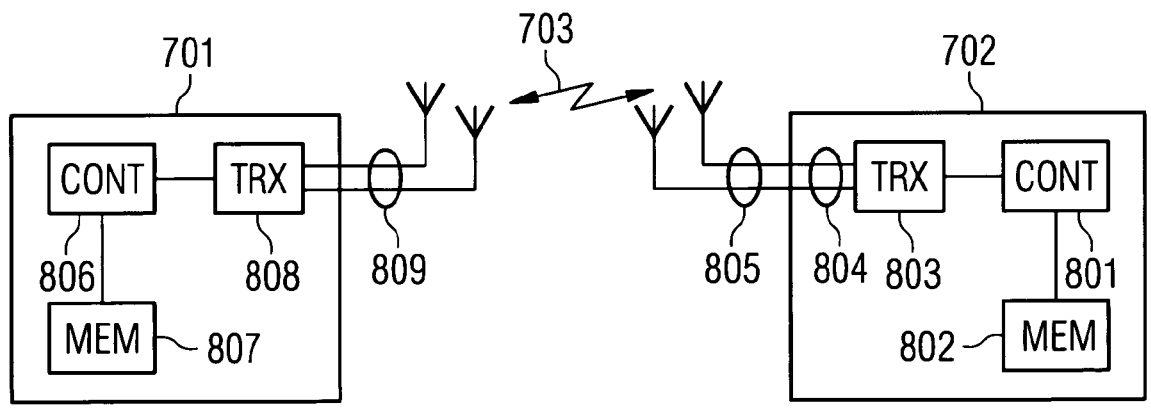
FIG. 8 shows a simplified block diagram illustrating exemplary apparatuses.

FIG. 8 is a block diagram of an apparatus according to an embodiment of the invention. FIG. 8 shows a user equipment 702 located in the area of a radio network node 701. The user equipment 702 is configured to be in connection with the radio network node 701. The user equipment or UE 702 comprises a controller 801 operationally connected to a memory 802 and a transceiver 803. The controller 801 controls the operation of the user equipment 802. The memory 802 is configured to store software and data. The transceiver 803 is configured to set up and maintain a wireless connection 703 to the radio network node 701. The transceiver 803 is operationally connected to a set of antenna ports 804 connected to an antenna arrangement 805. The antenna arrangement 805 may comprise a set of antennas. The number of antennas may be one to four, for example. The number of antennas is not limited to any particular number. The user equipment 702 may also comprise various other components, such as a user interface, camera, and media player. They are not displayed in the figure due to simplicity. The radio network node 701, such as an LTE (LTE-A) base station (eNode-B, eNB) or access point (AP), comprises a controller 806 operationally connected to a memory 807, and a transceiver 808. The controller 806 controls the operation of the radio network node 701. The memory 807 is configured to store software and data. The transceiver 808 is configured to set up and maintain a wireless connection to the user equipment 702 within the service area of the radio network node 701. The transceiver 808 is operationally connected to an antenna arrangement 809. The antenna arrangement 809 may comprise a set of antennas. The number of antennas may be two to four, for example. The number of antennas is not limited to any particular number. The radio network node 701 may be operationally connected (directly or indirectly) to another network element (not shown in FIG. 8) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 701, 702 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 701, 702 may generally include a processor, control-ler, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 802, 807 may include volatile and/or non-volatile memory and typically stores content, data, or the like. For example, the memory 802, 807 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 9:
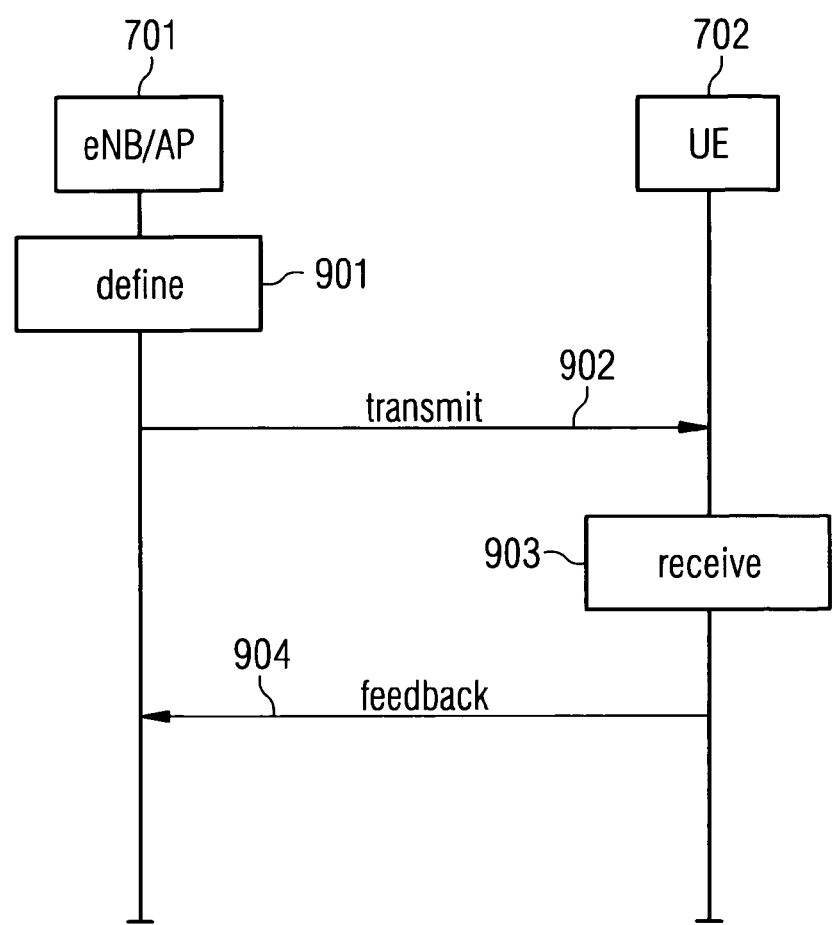
FIG. 9 shows a messaging diagram illustrating an exemplary messaging event according to an embodiment of the invention.

The signalling chart of FIG. 9 illustrates the required signalling. In the example of FIG. 9, a network apparatus 701 (which may comprise e.g. an LTE-capable (and/or LTE-A-capable) base station (eNode-B) or a WLAN access point (AP)) defines, in item 901, a link-independent hybrid automatic repeat request HARQ entity for one link direction. The defined entity comprises a resource allocation for one or more of uplink and downlink data, the resource allocation comprising at least one hybrid automatic repeat request HARQ process having a process identification, each HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of an uplink-downlink ratio. A timing relationship may be predefined by a standard. The network apparatus 701 may also have a capability to configure the timing relationship. This may be realized by proper signalling included e.g. in system information or beacon signals (not shown in FIG. 9). Thus the network apparatus 701 defines the HARQ entity to be applied, and performs data transmission and reception based on said defining. Thus, in item 902, the network apparatus 701 transmits a data packet for a HARQ process to at least one network node 702 (which may comprise e.g. a user terminal). In item 903, the network node 702 receives the data packet for the HARQ process transmitted by the network apparatus 701. The network node 702 decodes, in item 903, the received packet. Thus, the network node 702 is able to transmit, in item 903, HARQ feedback on PUCCH (or any other suitable channel) to the network apparatus 701 such that the hybrid automatic repeat request HARQ acknowledgement allocation has the predetermined timing offset with respect to the data allocation, wherein the timing offset of the hybrid automatic repeat request HARQ acknowledgement with respect to the data allocation is determined in terms of time division duplexing TDD frames and independently of an uplink-downlink ratio.

Figure 10:
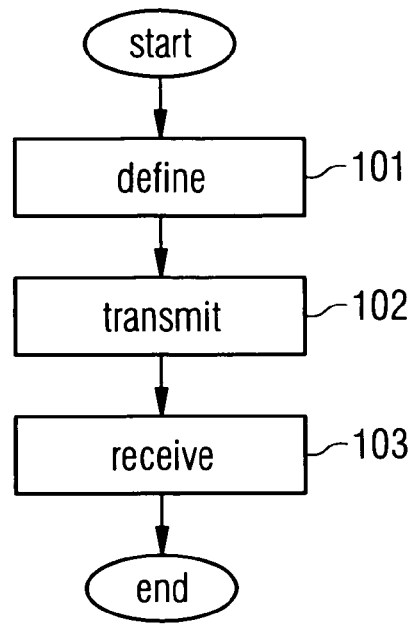
FIG. 10 shows a schematic diagram of a flow chart according to an exemplary embodiment of the invention.

FIG. 10 is a flow chart illustrating an exemplary embodiment. The apparatus 701, which may comprise e.g. an LTE-capable (and/or LTE-A-capable) base station (eNode-B, eNB) or WLAN access point (AP), defines, in item 101, a link-independent hybrid automatic repeat request HARQ entity for one link direction. The defined entity comprises a resource allocation for one or more of uplink and downlink data, the resource allocation comprising at least one hybrid automatic repeat request HARQ process having a process identification, each HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of an uplink-downlink ratio. Thus the network apparatus 701 defines the HARQ entity to be applied, and performs data transmission and reception based on said defining. Thus, in item 102, the network apparatus 701 transmits a data packet for a HARQ process to at least one network node 702 (network node, e.g. a user terminal, UE). In item 103, the network apparatus 701 receives feedback in PUCCH such that the hybrid automatic repeat request HARQ acknowledgement allocation has the predetermined timing offset with respect to the data allocation, wherein the timing offset of the hybrid automatic repeat request HARQ acknowledgement with respect to the data allocation is determined in terms of time division duplexing TDD frames and independently of an uplink-downlink ratio.

Figure 11:
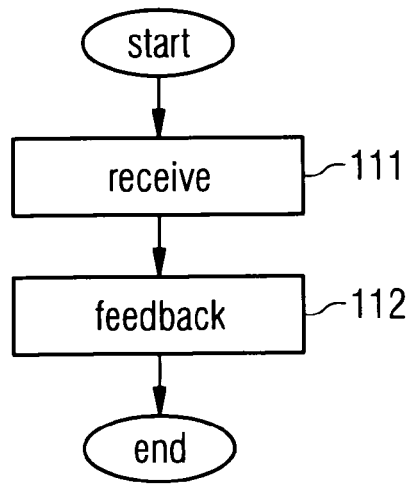
FIG. 11 shows a schematic diagram of a flow chart according to another exemplary embodiment of the invention.

FIG. 11 is a flow chart illustrating an exemplary embodiment. The apparatus 702, which may comprise e.g. a network element (network node, e.g. a user terminal, UE), receives, in item 111, receives a data packet related to a HARQ process where a link-independent hybrid automatic repeat request HARQ entity is defined for one link direction, wherein the entity comprises a resource allocation for one or more of uplink and downlink data, the resource allocation comprising at least one hybrid automatic repeat request HARQ process having a process identification, each HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of an uplink-downlink ratio. In item 112, the network element 702 provides, in item 112, to a further apparatus 701 (which may comprise e.g. an LTE-capable (or LTE-A-capable) base station (eNode-B, eNB) or WLAN access point (AP)) feedback related to the HARQ process such that the hybrid automatic repeat request HARQ acknowledgement allocation has a predetermined timing offset with respect to the data allocation, wherein the timing offset of the hybrid automatic repeat request HARQ acknowledgement with respect to the data allocation is determined in terms of time division duplexing TDD frames and independently of an uplink-downlink ratio.

It should be noted that in case of a device-to-device situation, the network apparatus 701 may include a user terminal instead of a base station. Similarly, in case of direct communication between APs/eNB, the network apparatus 702 may include a base station (or access point) instead of a user terminal.

The steps/points, signalling messages and related functions de-scribed above in FIGS. 1 to 11 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for hybrid automatic repeat request HARQ signalling in a communications system, wherein the method comprises defining, in a communications apparatus, a link-independent hybrid automatic repeat request HARQ entity for one link direction, wherein the defined entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio.

According to another exemplary embodiment, there is provided a method for defining, in the apparatus, a link-independent hybrid automatic repeat request HARQ entity for one hop by combining two hybrid automatic repeat request HARQ entities, one of the entities representing uplink HARQ and the other downlink HARQ.

According to yet another exemplary embodiment, there is provided a method for building, in the apparatus, a FDD-like hybrid automatic repeat request HARQ on top of a flexible time division duplexing TDD configuration.

According to yet another exemplary embodiment, there is provided a method for defining, in the apparatus, a hybrid automatic repeat request HARQ process such that a forward link HARQ process and a reverse link HARQ process can be included asynchronously in each frame.

According to yet another exemplary embodiment, there is provided a method for building, in the apparatus, a hybrid automatic repeat request HARQ entity such that a forward link HARQ control signal and a reverse link HARQ control signal as well as a forward link data signal and a reverse link data signal are included in a single time division duplexing TDD frame.

According to yet another exemplary embodiment, there is provided a method for defining, in the apparatus, a link-independent hybrid automatic repeat request HARQ entity for multiple hops by chaining HARQ entities such that each hop has one or more HARQ loops of its own running, where each node has a capability to transmit control signalling needed to support HARQ via involved links.

According to yet another exemplary embodiment, a maximum number of available HARQ processes is defined based on signalling and implementation constraints.

According to yet another exemplary embodiment, the timing offset of the hybrid automatic repeat request HARQ acknowledgement with respect to the data allocation is set in a different manner for uplink and downlink.

According to yet another exemplary embodiment, there is provided a method for allocating, in the apparatus one or more HARQ processes in a single frame.

According to yet another exemplary embodiment, there is provided an apparatus comprising at least one processor; and at least one memory including a computer program code, wherein the at least one memory and the computer program code are configured to, with the at least one processor, cause the apparatus to define, a link-independent hybrid automatic repeat request HARQ entity for one link direction, wherein the defined entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio.

According to yet another exemplary embodiment, the at least one memory and the computer program code are configured to, with the at least one processor, cause the apparatus to define a link-independent hybrid automatic repeat request HARQ entity for one hop by combining two hybrid automatic repeat request HARQ entities, one of the entities representing forward link HARQ and the other reverse link HARQ.

According to yet another exemplary embodiment, that at least one memory and the computer program code are configured to, with the at least one processor, cause the apparatus to build a FDD-like hybrid automatic repeat request HARQ on top of a flexible time division duplexing TDD configuration.

According to yet another exemplary embodiment, the at least one memory and the computer program code are configured to, with the at least one processor, cause the apparatus to define a hybrid automatic repeat request HARQ process such that a forward link HARQ process and a reverse link HARQ process are included asynchronously in each frame.

According to yet another exemplary embodiment, the at least one memory and the computer program code are configured to, with the at least one processor, cause the apparatus to build a hybrid automatic repeat request HARQ entity such that a forward link HARQ control signal and a reverse link HARQ control signal as well as a forward link data signal and a reverse link data signal are included in a single time division duplexing TDD frame.

According to yet another exemplary embodiment, the at least one memory and the computer program code are configured to, with the at least one processor, cause the apparatus to define a link-independent hybrid automatic repeat request HARQ entity for multiple hops by chaining HARQ entities such that each hop has one or more HARQ loops of its own running, where each node has a capability to transmit control signalling needed to support HARQ via involved links.

According to yet another exemplary embodiment, the at least one memory and the computer program code are configured to, with the at least one processor, cause the apparatus to define a maximum number of available HARQ processes based on signalling and implementation constraints.

According to yet another exemplary embodiment, the at least one memory and the computer program code are configured to, with the at least one processor, cause the apparatus to set the timing offset of the hybrid automatic repeat request HARQ acknowledgement with respect to the data allocation in a different manner for uplink and downlink.

According to yet another exemplary embodiment, the at least one memory and the computer program code are configured to, with the at least one processor, cause the apparatus to allocate one or more HARQ processes in a single frame.

According to yet another exemplary embodiment, there is provided a user terminal comprising at least one processor; and at least one memory including a computer program code, wherein the at least one memory and the computer program code are configured to, with the at least one processor, cause the user terminal to receive and provide feedback related to a link-independent hybrid automatic repeat request HARQ entity defined for one link direction, wherein the entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio.

According to yet another exemplary embodiment, there is provided a computer program product comprising program code means adapted to perform any one of the method steps when the program is run on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

ACK acknowledgement
ARQ automatic repeat request
CP cyclic prefix
DL downlink
eNB enhanced node-B
FDD frequency division duplexing
HARQ hybrid ARQ
LTE long term evolution
LTE-A LTE-advanced
NACK negative acknowledgement
PHICH physical HARQ indicator channel
PUCCH physical uplink control channel
PUSCH physical uplink shared channel
TDD time division duplexing
UL uplink
BLER block error ratio
ID identification
tx transmitter
rx receiver
D2D device to device
AP2AP access to access point

The invention claimed is:

1. A method, comprising:
defining, in a communications apparatus, a link-independent hybrid automatic repeat request HARQ entity for one link direction, wherein the defined entity comprises
a resource allocation for one or more of forward link and reverse link data, the resource allocation comprising at least one hybrid automatic repeat request HARQ process having a process identification, each hybrid automatic repeat request HARQ process having a unique HARQ identification,
a data allocation having a predetermined timing offset with respect to the resource allocation, and
a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio; and
performing by the communications apparatus hybrid automatic repeat request HARQ signalling in a communications system using the defined link-independent hybrid automatic repeat request HARQ entity.

2. A method according to claim 1, wherein defining further comprises defining, in the apparatus, a link-independent hybrid automatic repeat request HARQ entity for one hop by combining two hybrid automatic repeat request HARQ entities, one of the entities representing uplink HARQ and the other downlink HARQ.

3. A method according to claim 1, further comprising building, in the apparatus, a FDD-like hybrid automatic repeat request HARQ on top of a flexible time division duplexing TDD configuration.

4. A method according to claim 1, further comprising defining, in the apparatus, a hybrid automatic repeat request HARQ process such that a forward link HARQ process and a reverse link HARQ process can be included asynchronously in each frame.

5. A method according to claim 1, further comprising building, in the apparatus, a hybrid automatic repeat request HARQ entity such that a forward link HARQ control signal and a reverse link HARQ control signal as well as a forward link data signal and a reverse link data signal are included in a single time division duplexing TDD frame.

6. A method according to claim 1, further comprising defining, in the apparatus, a link-independent hybrid automatic repeat request HARQ entity for multiple hops by chaining HARQ entities such that each hop has one or more HARQ loops of its own running, where each node has a capability to transmit control signalling needed to support HARQ via involved links.

7. A method according to claim 1, wherein a maximum number of available HARQ processes is defined based on signalling and implementation constraints.

8. A method according to claim 1, wherein the timing offset of the hybrid automatic repeat request HARQ acknowledgement with respect to the data allocation is set in a different manner for uplink and downlink.

9. A method according to claim 1, further comprising allocating, in the apparatus one or more HARQ processes in a single frame.

10. An apparatus comprising
at least one processor; and
at least one memory including a computer program code, characterized in that the at least one memory and the computer program code are configured to, with the at least one processor, cause the apparatus to
define a link-independent hybrid automatic repeat request HARQ entity for one link direction, wherein the defined entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio; and
perform hybrid automatic repeat request HARQ signalling in a communications system using the defined link-independent hybrid automatic repeat request HARQ entity.

11. An apparatus according to claim 10, wherein the at least one memory and the computer program code are configured to, with the at least one processor, cause the apparatus to define a link-independent hybrid automatic repeat request HARQ entity for one hop by combining two hybrid automatic repeat request HARQ entities, one of the entities representing forward link HARQ and the other reverse link HARQ.

12. An apparatus according to claim 10, wherein at least one memory and the computer program code are configured to, with the at least one processor, cause the apparatus to build a FDD-like hybrid automatic repeat request HARQ on top of a flexible time division duplexing TDD configuration.

13. An apparatus according to claim 10, wherein the at least one memory and the computer program code are configured to, with the at least one processor, cause the apparatus to define a hybrid automatic repeat request HARQ process such that a forward link HARQ process and a reverse link HARQ process are included asynchronously in each frame.

14. An apparatus according to claim 10, wherein the at least one memory and the computer program code are configured to, with the at least one processor, cause the apparatus to build a hybrid automatic repeat request HARQ entity such that a forward link HARQ control signal and a reverse link HARQ control signal as well as a forward link data signal and a reverse link data signal are included in a single time division duplexing TDD frame.

15. An apparatus according to claim 10,
wherein the at least one memory and the computer program code are configured to, with the at least one processor, cause the apparatus to define a link-independent hybrid automatic repeat request HARQ entity for multiple hops by chaining HARQ entities such that each hop has one or more HARQ loops of its own running, where each node has a capability to transmit control signalling needed to support HARQ via involved links.

16. An apparatus according to claim 10,
wherein the at least one memory and the computer program code are configured to, with the at least one processor, cause the apparatus to define a maximum number of available HARQ processes based on signalling and implementation constraints.

17. An apparatus according to claim 10,
wherein the at least one memory and the computer program code are configured to, with the at least one processor, cause the apparatus to set the timing offset of the hybrid automatic repeat request HARQ acknowledgement with respect to the data allocation in a different manner for uplink and downlink.

18. An apparatus according to claim 10,
wherein the at least one memory and the computer program code are configured to, with the at least one processor, cause the apparatus to allocate one or more HARQ processes in a single frame.

19. A user terminal comprising
at least one processor; and
at least one memory including a computer program code, characterized in that the at least one memory and the computer program code are configured to, with the at least one processor, cause the user terminal to
receive a link-independent hybrid automatic repeat request HARQ entity defined for one link direction, wherein the entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio; and provide feedback related to the link-independent hybrid automatic repeat request HARQ entity.

20. A computer program product comprising a non-transitory computer-readable medium bearing computer program code embodied therein for use with a computer, the computer program code comprising:

code for defining, in a communications apparatus, a link-independent hybrid automatic repeat request HARQ entity for one link direction, wherein the defined entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio; and code for performing by the communications apparatus hybrid automatic repeat request HARQ signalling in a communications system using the defined link-independent hybrid automatic repeat request HARQ entity.

21. A computer program product comprising a non-transitory computer-readable medium bearing computer program code embodied therein for use with a computer, the computer program code comprising:

code for receiving a link-independent hybrid automatic repeat request HARQ entity defined for one link direction, wherein the entity comprises a resource allocation for one or more of forward link and reverse link data, the resource allocation comprising at least one hybrid automatic repeat request HARQ process having a process identification, each hybrid automatic repeat request HARQ process having a unique HARQ identification, a data allocation having a predetermined timing offset with respect to the resource allocation, and a hybrid automatic repeat request HARQ acknowledgement allocation having a predetermined timing offset with respect to the data allocation, wherein the timing offset of the hybrid automatic repeat request HARQ acknowledgement with respect to the data allocation is determined in terms of time division duplexing TDD frames and independently of a forward link-reverse link ratio; and code for providing feedback related to the link-independent hybrid automatic repeat request HARQ entity.

* * * * *